United States Patent
Yoshii et al.

[11] 3,887,745
[45] June 3, 1975

[54] FINGER-TEARABLE ADHESIVE TAPE

[75] Inventors: Toshiya Yoshii, Kyoto; Masaru Suzuki, Otsu, both of Japan

[73] Assignee: Toray Industries, Inc., Tokyo, Japan

[22] Filed: Aug. 9, 1973

[21] Appl. No.: 387,023

[30] Foreign Application Priority Data
Sept. 8, 1972  Japan.............................. 47-89511
Oct. 16, 1972  Japan............................ 47-118570

[52] U.S. Cl. ................ 428/213; 150/224; 428/212; 428/516
[51] Int. Cl. ............................................ B32b 7/00
[58] Field of Search ........... 161/167, 402, 406, 252, 161/411, 166; 117/130.8 E, 7, 68, 76 A, 122 R, 161 R; 156/229

[56] References Cited
UNITED STATES PATENTS
3,620,825  11/1971  Lohmann et al......................... 117/7
3,671,383  6/1972  Sakata et al. ....................... 161/402

*Primary Examiner*—George F. Lesmes
*Assistant Examiner*—Stanley S. Silverman

[57] ABSTRACT

This invention pertains to an adhesive tape, the base component of which is comprised of a biaxially oriented film of a propylene polymer and a transversely oriented film of a propylene polymer, the melting point of the transversely oriented film being 0.5° – 10°C higher than that of the biaxially oriented film and the total thickness of the transversely oriented film being 1.2 – 5.0 times greater than that of the biaxially oriented film.

8 Claims, 4 Drawing Figures

FINGER-TEARABLE ADHESIVE TAPE

BACKGROUND OF THE INVENTION

Cellophane-base adhesive tape is used extensively throughout the world and is quite popular. The most desirable properties of cellophane for use as the base of an adhesive tape are its transparency, toughness, finger-tearability and low cost. However, the cellophane tape has poor dimensional stability, because cellophane is not moisture resistant. It is well known that cellophane swells under moist conditions and then shrinks under dry conditions. These changes sometimes cause problems when cellophane-base adhesive tape is used in various applications.

In light of this deficiency, it would be more desirable to use a synthetic resin film which is moisture resistant for the base of adhesive tape instead of cellophane. A conventional biaxially oriented film of a propylene polymer has the same desirable properties as cellophane, with the exception of finger-tearability, and in addition it possesses excellent moisture resistance. It is quite inconvenient to use an adhesive tape which can not be easily torn with the fingers and, consequently, the lack of finger-tearability is one of the reasons why adhesive tapes of biaxially oriented propylene polymer have not become popular. Therefore, if adhesive tape can be made having a base component of a finger-tearable, biaxially oriented film of a propylene polymer, it will be superior to the cellophane-base adhesive tape.

Several ideas have been proposed in the past to produce a finger-tearable adhesive tape from a biaxially oriented film of propylene polymer. Notching the film was one such idea; but notched film lacks toughness. Incorporating a considerable amount of inorganic filler into the film has also been suggested; but such a film loses its transparency.

Now, in accordance with this invention it has been found that improved adhesive tape having distinct multiple layers of propylene polymer film can be produced without the aforementioned disavantages and in such a manner that the adhesive tape so produced is tough, transparent, finger-tearable, moisture resistant, and inexpensive.

SUMMARY OF THE INVENTION

The present invention pertains to adhesive tape comprised of an adhesive layer and a base component of a multi-layered thermoplastic film comprised of a biaxially oriented (hereinafter referred to as "BO") film of a propylene polymer and a uniaxially oriented (hereinafter referred to as "UO") film of a propylene polymer which is transversely oriented, the melting point of the UO propylene polymer being at least 0.5°C higher than the BO propylene polymer and the total thickness of the UO film being at least 1.2 times greater than that of the BO film.

One object of this invention is to provide an improved adhesive tape and a base component thereof which is very similar to cellophane-base adhesive tape and which is, moreover, moisture resistant.

Another object of this invention is to provide a finger-tearable adhesive tape which has as its base component a multi-layered thermoplastic film having little tendency to curl in the adhesive tape manufacturing process.

DETAILED DESCRIPTION OF THE INVENTION

Throughout the specification it is to be understood that a propylene polymer may be any polymer comprised of propylene or homologues thereof or any copolymer wherein propylene is the predominant constituent.

Now, in accordance with this invention it has been found that improved adhesive tape having a base comprised of multi-layered propylene polymer film can be produced without the aforementioned disadvantages and that the adhesive tape so produced is characteristically tough, transparent, finger-tearable, moisture resistant and inexpensive. The multi-layered propylene polymer films used in the base of adhesive tape of this invention are produced as follows:

a. A longitudinally oriented propylene polymer sheet is laminated with molten or solid propylene polymer to make a double-layered sheet. Then, this sheet is oriented transversely and heat-set, or b. A longitudinally oriented propylene polymer sheet is sandwiched between molten or solid propylene polymer to make a triple-layered sheet. Then, this sheet is oriented transversely and heat-set.

It may appear that this process is very similar to those described in U.S. Pat. Nos. 3,620,825 and 3,671,383. However, substantial differences exist between the prior art and the present invention.

The first difference pertains to the melting point of each of the different layers of propylene polymer. According to the prior art, the melting point of the UO propylene polymer is the same as, or lower than, that of the BO propylene polymer. As a result, the propylene polymer films produced by the prior art will not be finger-tearable. On the contrary, the melting point of the UO propylene polymer of this invention is at least 0.5°C higher than that of the BO propylene polymer. If this condition is not satisfied, the multi-layered film obtained is not finger-tearable and has a tendency to curl in the adhesive tape manufacturing process.

The preferable difference in melting point between the UO and BO propylene polymer ranges from 1°C to 5°C. A difference up to 10°C is acceptable, but if the melting point difference exceeds 10°C there are undesirable consequences, for example, a lack of toughness and finger-tearability. Therefore, in this invention the melting point of the UO propylene polymer layer must be 0.5° – 10°C, and preferably 1° – 5°C, higher than that of the BO propylene polymer layer.

Figure 1:
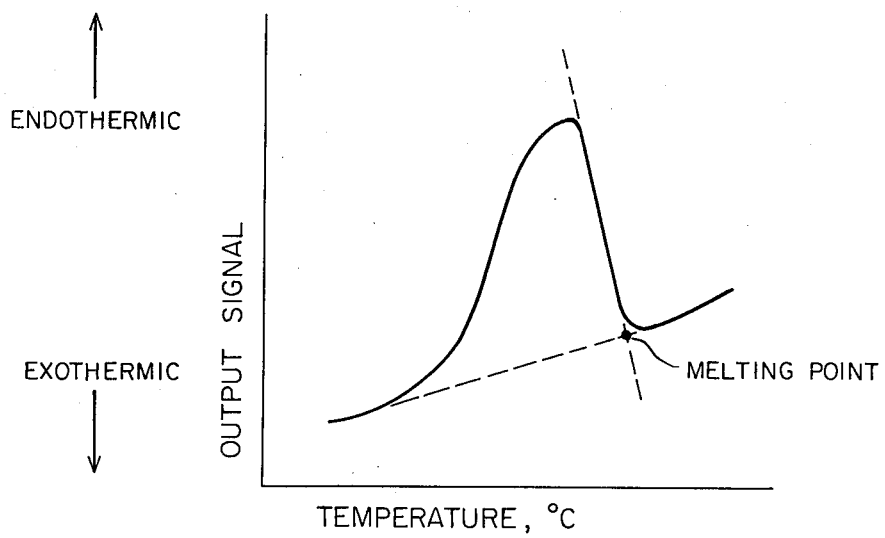
FIG. 1 illustrates a Differential Scanning Calorimeter chart used for measuring the melting point of a propylene polymer.

A Differential Scanning Calorimeter, (hereinafter referred to as "DSC"), is used for the measurement of the melting point of the propylene polymers. The measuring procedure is as follows:

1. A 10 mg sample is placed in the instrument and a nitrogen atmosphere is maintained around the sample;
2. The temperature is raised to 230°C to melt the sample and is thereafter maintained at this level for 5 minutes;

3. The molten sample is then immediately placed in liquid nitrogen, so as to solidify it;
4. The solidified sample is thereafter reset in the DSC under a nitrogen atmosphere and the temperature is raised to 200°C at the rate of 10°C per minute;
5. The endothermic curve produced by the fusion of propylene polymer crystals is recorded on the DSC chart as illustrated in FIG. 1, wherein the output signal peak is superimposed on a curve corresponding to the temperature increase and the position of this peak along this base curve corresponds to the melting point of the sample.

The melting point of propylene polymers measured by the DSC method ranges from 140°C to 170°C.

There are many methods by which the melting point of the propylene polymer may be controlled. Copolymerization of propylene with other olefins, change of Isotacticity, and variation of the molecular weight distribution are effective for changing the melting point. Also, blending of other polymers such as polyethylene or blending inorganic particles such as talc into the propylene polymer will sometimes result in changing the melting point. It is also possible to change the melting point of some propylene polymers by adding specific organic agents such as phthalic acid anhydride to the propylene polymer. It is to be understood that techniques for changing the melting point of propylene polymers are not limited to those herein mentioned. The only limitation upon melting point in this invention is that the melting point of the UO layer must be 0.5° – 10°C, and preferable 1° – 5°C, higher than that of the BO layer.

In a preferred embodiment of this invention, a propylene polymer having an Intrinsic Viscosity of 1.8 – 2.8 in tetralin at 135°C is used for the BO layer and a propylene polymer having an Intrinsic Viscosity of 1.5 – 2.2 in tetralin at 135°C is used for the UO layer. Likewise, the propylene polymer used for the BO layer should have an Isotacticity Index of 80 – 97 percent by weight and the propylene polymer used for the UO layer should have an Isotacticity Index of 90 – 98 percent by weight.

In other preferred embodiments of this invention, ethylene/propylene copolymers of 0.5 – 2.0 weight percent of ethylene units are used for the BO layer and ethylene/propylene copolymers of less than 1.0 weight percent of ethylene units are used for the UO layer.

The second difference between the prior art and this invention pertains to the thickness ratio of the multi-layered film. According to the prior art, the thickness of the UO layer is much less than that of the BO layer. As a result, the films produced by the prior art will not be finger-tearable. On the contrary, the thickness of the UO layer of this invention must be at least 1.2 times greater than that of the BO layer. When multiple layers of UO film are used, the total thickness of the UO layers must satisfy the above conditions. Unless the thickness of the UO layers exceeds the thickness of the BO layers by a factor of 1.2 to 5.0, the multi-layered film obtained will not be finger-tearable.

The preferable thickness of the UO layer ranges from 1.2 to 5.0 times, and more preferably from 1.5 to 3.0 times, the thickness of the BO layer. If the thickness of the UO layer exceeds 5.0 times the thickness of the BO layer, there are some undesirable results such as lack of toughness and excessive elongation.

The preferable birefringence of this multi-layered film ranges from 0.015 to 0.030. If the birefringence is less than 0.015, the adhesive tape loses the finger-tearability. On the contrary, if the birefringence is more than 0.030, the adhesive tape becomes brittle and loses toughness. Moreover, the multi-layered propylene polymer film having a birefringence of 0.015 – 0.030 has little tendency to curl. As is well known, curling of the film causes considerable difficulty in the adhesive tape manufacturing process.

The adhesive tape of this invention is produced by coating such a multi-layered film with an adhesive component. Before coating, the surface of multi-layered film may be treated with corona discharge, flame, or oxidizing chemical agents to improve adhesion. It is also possible to coat the multi-layered film with primers such as polyethylene imine, chlorinated propylene polymer or organic titanates in order to promote adhesion between the film and the adhesive components.

Many kinds of adhesives are applicable for these tapes. Typical examples are adhesives which contain natural rubber, synthetic rubber, polyvinylether or acrylic ester copolymer. Hot-melt adhesives are also applicable. These adhesives are often used together with organic solvents. The preferred solvents for making a solution from these adhesives are toluene, xylene, heptane, hexane, cyclohexane, and various alcohols. In addition, mixed solvents are often effective.

The surface of the multi-layered film is coated with a solution containing the adhesive component. Then the coated film is dried to eliminate the solvent. While there are many techniques for drying, hot air is most common. The temperature of hot air should be lower than 120°C, and preferably a temperature of 100°C, is recommended. If the drying temperature is too high, the coated film tends to curl. Such curling is the major problem encountered in the drying process. While a multi-layered film of this invention has improved curl-resistance, it can not prevent curling if the drying temperature exceeds 120°C.

After drying, if necessary, the other, untreated surface of the coated film may be coated with a back-sizing agent which can improve easy-release properties. It is to be understood that for purposes of this invention, a back-sizing agent may be any release agent coated onto the non-adhesive surface of an adhesive tape to make unwinding of the tape from a roll thereof less difficult. Typical back-sizing agents include polyvinyl carbamate, copolymers of vinyl ester and maleic acid ester, copolymers of octadecyl acrylate and acrylic acid, copolymers of vinyl stearate and maleic acid anhydride, partially esterified polyvinyl alcohol and polymethylsiloxane.

Figure 2:
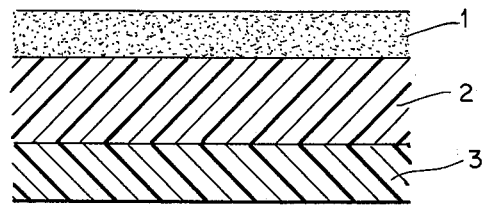
FIGS. 2, 3 and 4 illustrate cross sections of various adhesive tapes made in accordance with the present invention.
Figure 3:
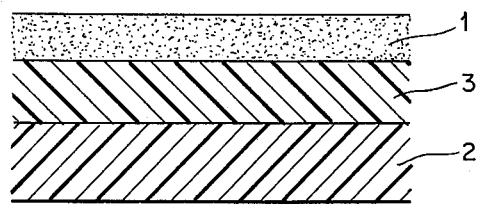
Figure 4:
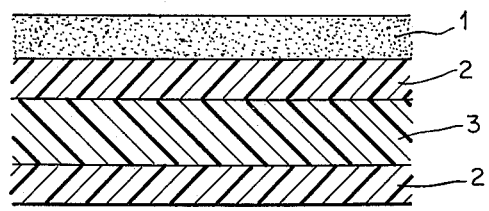

The coated film thus obtained is then slit into the appropriate width and wound up onto a core to form a roll of the adhesive tape. Cross sections of the adhesive tapes of this invention are illustrated in FIGS. 2, 3 and 4. In these figures like reference numerals denote like components throughout and 1 is an adhesive layer, 2 is a UO layer of propylene polymer film and 3 is a layer of BO propylene polymer film.

EXAMPLE 1

An Isotactic propylene/ethylene copolymer sheet, having an Intrinsic Viscosity of 2.2 in tetralin at 135°C, 1.0 percent by weight of ethylene units and a melting point of 163°C, was uniaxially stretched to 5.0 times its original dimension in the longitudinal direction while the temperature was held at 135°C. Thereafter, molten propylene/ethylene copolymer, having an Intrinsic Viscosity of 1.6, 0.6 percent by weight of ethylene units and a melting point of 166°C, was laminated onto the uniaxially stretched sheet by melt extrusion. Then, the double-layered sheet was stretched to 8.0 times its original dimension in the transverse direction at 140°C and heat-set at 150°C for 3 seconds.

A double-layered film having a thickness of 35 microns was produced and consisted of a BO layer of 12 microns and a UO layer of 23 microns. The birefringence of this double-layered film was 0.020. The surface of the UO layer was then treated with corona discharge and the following adhesive mixture was coated onto the treated surface:

| | Parts by Weight |
|---|---|
| Polyisoprene rubber | 20 |
| Polyterpene resin | 8 |
| Zinc resinate | 2 |
| Tricrezyl phosphate | 1 |
| Oil-soluble phenol-formaldehyde resin | 1 |
| Heptane | 70 |
| Toluene | 4 |
| Ethanol | 4 |

The coated film was then dried using hot air at 90°C. No severe curling was experienced during drying. After drying, the coated film was slit and wound onto a paper core. The adhesive tape produced was 1 inch wide and very similar to cellophane-base adhesive tape. Furthermore, it was finger-tearable, tough and transparent. Moreover, this tape was superior to cellophane tape in moisture resistance and possessed the following properties:

| | |
|---|---|
| Tensile strength | 7.4 kg |
| Tensile elongation | 116 % |
| Edge tear resistance | 9.0 kg |
| Haze | 1.6 % |
| Moisture resistance | excellent |
| Adhesive strength | 750 g (to steel plate) |

EXAMPLE 2

An Isotactic propylene polymer sheet, having an Intrinsic Viscosity of 2.4, a melting point of 168°C, and a thickness of about 400 microns, was longitudinally stretched to 5.0 times its original dimension at 140°C. Thereafter, a molten Isotactic propylene polymer at 260°C and having an Intrinsic Viscosity of 1.7 and a melting point of 170°C was laminated onto the uniaxially stretched sheet by melt extrusion.

This double-layered sheet was then transversely stretched to 9.0 times its original dimension at 148°C. The stretching rate was 5,000 percent/minute. Then, it was heat-set at 145°C for 1 second under tension and thereafter heat-set at 145°C for 3 seconds, while 8 percent transverse shrinkage was permitted.

Then, the surface of the UO layer was treated with corona discharge to increase the wetting tension thereof up to 45 dyne/cm. A double-layered film of a thickness of about 40 microns was produced and consisted of a BO layer of 10 microns and a UO layer of 30 microns. The birefringence of this film was 0.022.

A solution of an adhesive containing synthetic rubber was coated onto the treated surface of the film. After drying, the coated film was slit to a width of 1 inch and wound up onto a core. The adhesive tape thus produced had a tensile strength of 5 kg, which is sufficient for practical usage, and it also had excellent finger-tearability. Moreover, this adhesive tape had good adhesion between the base film and adhesive layers and exhibited no tendency to curl.

EXAMPLE 3

An Isotactic propylene polymer sheet having an Intrinsic Viscosity of 2.40, a melting point of 167°C, and a thickness of 400 microns, was longitudinally stretched to 5.0 times its original dimension at 135°C. Onto both sides of this sheet, molten propylene polymer, having an Intrinsic Viscosity of 1.60 and a melting point of 169°C, was laminated by melt extrusion. Then, the triple-layered sheet was transversely stretched to 8.5 times its original dimension at 155°C and heat-set at 150°C under relaxed tension in a tenter oven.

A clear triple-layered film of a thickness of 30 microns was produced and had the following configuration of layers each being 10 microns thick.

UO/BO/UO

The birefringence of this film was 0.019.

Both sides of this film were treated with corona discharge. Then, one side was coated with a solution of back-sizing agent containing silicone polymer and the other side was coated with a solution of adhesives containing synthetic rubber and polyterpene resin. The coated film was dried at 90°C in a hot air oven.

The coated film showed little tendency to curl while drying. After drying, the coated film was slit to a width of 1 inch and wound up onto a paper core. The adhesive tape thus produced was easily tearable with the fingers and had a tensile strength of 7.0 kg and tensile elongation of 110 percent. The tape did not curl when it was held in an 80°C atmosphere.

EXAMPLE 4

An Isotactic propylene polymer having an Intrinsic Viscosity of 2.30, an Isotacticity Index of 92 wt percent, a melting point of 165°C and a thickness of 200 microns, was uniaxially stretched to 5.0 times its original dimension in the longitudinal direction. Molten propylene polymer having an Intrinsic Viscosity of 1.60, an Isotacticity Index of 96 wt percent and a melting point of 168°C, was laminated onto this sheet to make a double-layer sheet of a thickness of 320 microns. This sheet was transversely stretched to 9.0 times its original dimension at 155°C in the tenter oven. After stretching, the film was heat-set at 150°C for 3 seconds under tension and thereafter, heat-set at 150°C while 15 percent transverse shrinkage was permitted. The film was then cooled.

A double-layered film of a thickness of 40 microns was produced and consisted of a 15 micron BO layer and a 25 micron UO layer. The birefringence of this film was 0.018.

After activating both surfaces of this film by corona discharge, the UO side of the film was coated with a silicone-type back-sizing agent and the BO side of the film was coated with an adhesive containing synthetic rubber. The coated film was dried at a temperature of 70° – 90°C. There was no difficulty using this drying process, because the film did not curl.

After drying, the coated film was slit to a width of 1 inch make the adhesive tape. The adhesive tape thus produced had a good finger-tearability, comparable with the cellophane-base adhesive tapes in the market today. Moreover, it had sufficient tensile strength of 8.0 kg. Even when this tape was held in an atmosphere of 60° – 80°C, it did not exhibit any curl.

What is claimed is:

1. A finger-tearable adhesive tape having longitudinal and transverse dimensions and having an adhesive layer applied to a laminated film base, said base comprising a layer of propylene polymer film which is biaxially oriented and at least one other layer of a propylene polymer film which is uniaxially oriented in a transverse direction, the melting point of said uniaxially oriented film being 0.5° – 10° C higher than the melting point of said biaxially oriented film, and the total thickness of said uniaxially oriented film being 1.2 – 5.0 times greater than the total thickness of said biaxially oriented film.

2. An adhesive tape according to claim 1, wherein the melting point of said uniaxially oriented film is 1° – 5°C higher than that of said biaxially oriented film.

3. An adhesive tape according to claim 1, wherein the total thickness of said uniaxially oriented film is 1.5 – 3.0 times greater than the total thickness of said biaxially oriented film.

4. An adhesive tape according to claim 1, wherein the birefringence of said laminated film is from 0.015 to 0.030.

5. An adhesive tape according to claim 1, wherein the Intrinsic Viscosity in tetralin at 135°C is 1.5 – 2.2 for said uniaxially oriented propylene polymer and 1.8 – 2.8 for said biaxially oriented propylene polymer.

6. An adhesive tape according to claim 1, wherein said uniaxially oriented film has an Isotacticity Index of 90 – 98 percent by weight and said biaxially oriented film has as Isotacticity Index of 80 – 97 percent by weight.

7. An adhesive tape according to claim 1, wherein said propylene polymer is polypropylene.

8. An adhesive tape according to claim 1, wherein said biaxially oriented polymer is an ethylene/propylene copolymer of 0.5 – 2.0 percent ethylene by weight and said uniaxially oriented polymer is selected from the group consisting of polypropylene and ethylene/propylene copolymer of less than 1.0 percent ethylene by weight.

* * * * *